UNITED STATES PATENT OFFICE.

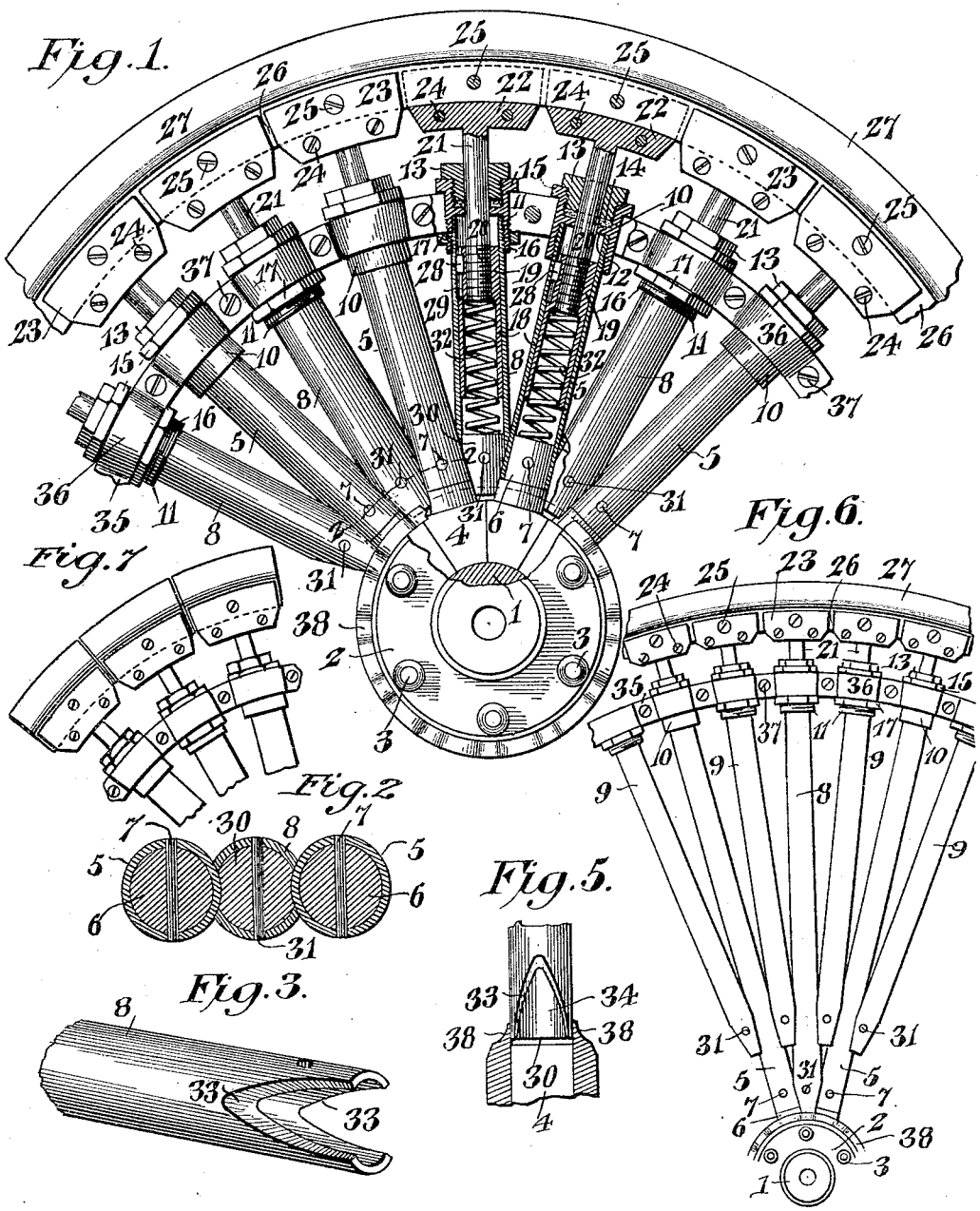

JOHN J. FAHRNEY, OF TIMBERVILLE, VIRGINIA, ASSIGNOR, BY DIRECT AND MESNE ASSIGNMENTS, TO FAHRNEY WHEEL CORPORATION, OF TIMBERVILLE, VIRGINIA, A CORPORATION OF VIRGINIA.

RESILIENT WHEEL.

1,122,889.  Specification of Letters Patent.  Patented Dec. 29, 1914.

Application filed November 21, 1913. Serial No. 802,247.

*To all whom it may concern:*

Be it known that I, JOHN J. FAHRNEY, a citizen of the United States, residing at Timberville, in the county of Rockingham and State of Virginia, have invented a new and useful Resilient Wheel, of which the following is a specification.

This invention has reference to improvements in resilient wheels, and its object is to provide a wheel absorbent of shocks which would be transmitted by a rigidly constructed wheel to the running gear of a vehicle.

The present invention is an improvement upon the vehicle wheels shown in applications No. 652,873, filed by me on October 4, 1911; No. 737,906, filed by me on December 20, 1912, and No. 741,602, filed by me on January 11, 1913.

In the several applications there are shown spokes radiating from a hub with each spoke entered at the outer end by a plunger provided with a tire sustaining head and backed up by a spring lodged within the spoke, while between the spokes are shorter sleeve-like members in radial relation to the hub and supported by a ring concentric with the hub and spaced at some distance from the hub toward the rim of the wheel, while at the outer ends of the spokes and intermediate members, all carrying plungers and springs and tire sustaining heads, another sustaining and spacing ring is provided more distant from the hub than the first-named ring and concentric with both.

In accordance with the present invention the inner ring is eliminated, and the intermediate plunger supporting and spring containing radial members are continued so close to the hub as to have their inner ends lodged between adjacent spokes, and, in the case of particularly large wheels, still another intermediate member is provided between each spoke and intermediate member carried to the hub end of the spoke. Each intermediate member whether extending fully to the hub or stopping somewhat short thereof, is so shaped at the inner end that it is lodged either between two adjacent spokes or between a spoke and adjacent intermediate member in a manner to prevent any lateral displacement at such point. With such an arrangement the appearance of the wheel as a whole is greatly improved and the strength of the wheel is greatly improved, since so far as strength is concerned the intermediate members add materially to the stiffness of the wheel against collapse.

The invention will be best understood from a consideration of the following detailed description, taken in connection with the accompanying drawings forming a part of this specification, with the further understanding that while the drawings show a practical form of the invention, the latter is not confined to any strict conformity with the showing of the drawings, but may be changed and modified so long as such changes and modifications mark no material departure from the salient features of the invention.

In the drawings:—Figure 1 is an elevation with some parts in section and other parts broken away, of a portion of a wheel embodying the present invention. Fig. 2 is a fragmentary section on the line 2—2 of Fig. 1, but drawn on a larger scale. Fig. 3 is a perspective view of the hub end of one of the intermediate members. Fig. 4 is a perspective view of a block lodged in the hub end of each of the intermediate members. Fig. 5 is an axial section through a portion of the hub where embracing one of the intermediate members, other parts being omitted. Fig. 6 is an elevation showing the arrangement for a wheel of materially larger diameter than that indicated in Fig. 1. Fig. 7 is a detail elevation of a modified form.

Referring to the drawings there is shown a wheel provided with a hub 1 including face plates 2 held together by bolts 3 and embracing segmental hub ends 4 of spokes 5. These spokes are in the form of tubes, each carrying at the hub end a segmental block 4 and the number of spokes with their blocks 4 is such that the blocks may be brought into side contact throughout the circumference of the hub, wherefore the number of spokes which may be employed is dependent upon the size of the hub and the size of the wheel. Each block 4 has a stem 6 entering the corresponding end of a respective spoke 5 and held therein by a pin 7 and any suitable fastening means, such as brazing, the tubular spoke 5 and block 4 being of metal and customarily of steel.

Between adjacent spokes there is provided a tubular intermediate or supplemental member 8 and in the case of wheels of particularly large diameter, additional intermediate members 9 are lodged between each spoke and the intermediate member 8, as shown in Fig. 6.

Each spoke and intermediate member terminate at substantially the same distance from the axis of the hub and applied to the exterior of the outer end of each spoke is a sleeve 10, a similar sleeve 11 being applied to the outer end of each intermediate member, and the outer ends of the spokes and intermediate members may be threaded so that the sleeves 10 or 11, as the case may be, also suitably threaded, may be screwed thereupon. Each sleeve 10 or 11 has at a point between its ends an interior lateral web 12 and each sleeve between the web and its outer end is internally threaded for the reception of a bushing or nut 13 in the nature of a gland holding packing material 14 against the web 12. The outer end of each sleeve is formed with a circumferential outstanding flange 15 which, as well as the nut 13, may be shaped hexagonally or otherwise, for the application of a tool, usually a wrench.

Each sleeve 11 is externally threaded, as indicated at 16, for an appropriate distance to receive a nut 17.

Within each spoke and supplemental member 8 is an elongated slidable sleeve 18 having the outer end 19 thickened toward its longitudinal axis and longitudinally threaded to receive the threaded end 20 of a plunger stem 21 extending through an appropriate passage in the web 12 and gland 13, as well as the packing 14, and terminating at the outer end, that is, beyond the gland 13, in a laterally expanded channel head 22 having one side face 23 removable, being held to the main portion of the head by screws or bolts 24, while traversing the sides of the channel members are screws or bolts 25 in turn traversing an inner web portion 26 of a tire 27, said tire and its web 26 being made of rubber or suitable elastic or semi-elastic material with or without embedded webbing, the tire following any of the usual practices in its construction, but preferably this tire is of the continuous or unbroken type, although sectional tires made up of blocks 27ª such as indicated in Fig. 7 are not precluded in connection with the present invention.

The threaded end 20 of each stem 21 may be further secured by brazing to the sleeve 18, if desired. Each sleeve 18 carries a key or spline 28 adapted to a groove 29 formed lengthwise of the inner wall of the spoke or intermediate member, thereby permitting an appropriate longitudinal movement of the sleeve without turning movement thereof, and thus holding each head 22 which is elongated circumferentially of the wheel, in proper relation to the other like heads.

Each supplemental member 8 has a block 30 housed in it at its inner end and there held by a pin 31 and to insure the secure fastening of the block it is also brazed in place. The blocks 4 and 30 form abutments for springs 32 within each spoke and intermediate member, said springs entering the respective sleeves 18 and abutting against the thickened portions 19 or the adjacent end of the stem 21 or both.

Opposite sides of the intermediate members 8 and corresponding portions of the blocks 30 are beveled as indicated at 33, and 34, respectively, and these beveled portions are concaved to fit between the approaching rounded sides of adjacent spokes and the inner ends of the additional members 9 are correspondingly constructed to fit between a spoke and the next adjacent intermediate member.

Matching rings 35 having half-rounds 36 in appropriately spaced relation are applied to the sleeves 10 and 11 and between the half rounds the matching rings are traversed by bolts 37 securing them together in embracing relation to the sleeves. After the rings are applied and before the bolts 37 are finally tightened the nuts 17 are screwed against the inner edge of the rings 35 to force the intermediate members 8 into tightly wedging relation to the hub ends of the spokes, and the same treatment is accorded to the extra members 9 when employed. Now, having lodged the intermediate members 8 firmly in position, the bolts 37 are tightened up so that all the sleeves 10 and 11 are firmly clamped by the rings 35 and the latter serve to hold the outer ends of the spokes and intermediate members in proper relation and withstand all side strains, wherefore the heads 22 are always maintained in their proper position circumferentially.

The face plates 2 are of such radial extent as to cover the inner ends of the intermediate members where lodged between adjacent spokes, and each may be formed with a marginal flange 38 suitably shaped to conform to the invected or crenate faces presented by the assembled spokes and intermediate members where covered by the flange 38, thereby making a tight joint resistant to the entrance of dust and dirt into the interior of the hub. This arrangement of the face plates of the hub is advantageous since for mechanical reasons and because of the longitudinal adjustment of the intermediate members 8 it is not advisable to make them quite long enough to seat against the blocks 4.

The springs 32 are made resistant enough to support the weight of the vehicle when the wheel is rolling over a smooth surface, but should the tire come into contact with some obstruction offering a resistance, then the spring or springs controlling the portion of the tire meeting the obstruction will yield and the wheel will override the obstruction without imparting a shock or jar to the running gear and possibly to the body of the vehicle. The effect is similar to that of a pneumatic tire when properly pumped up as demanded by the tire makers, for such a tire is not normally yieldable to the weight of the vehicle to a noticeable extent, but does yield readily to sudden impacts due to obstructions, and the same is true of the wheel of the present invention.

The number of spokes which may be employed is necessarily limited by the size of the wheel, but an additional number of elements operating as spokes may be introduced between the spokes entering the hub and have their inner ends lodged so close to the hub that they are held substantially as rigidly as the actual spokes, wherefore a wheel of a size admitting a certain number of spokes may be provided for all practical purposes with double the number of spokes for the intermediate members become supplemental spokes. Moreover, in large wheels the additional intermediate members can be brought sufficiently close to the hub to still act as supplemental spokes. It follows, therefore, that wheels of different diameters may be constructed without increasing the circumferential extent of the heads 24, so that the degree of elastic yield is maintained irrespective of the diameter of the wheel and the strength of the wheel is maintained for wheels of different diameters without increasing the sizes of the hub, the spokes or other parts, the only differences being in the employment of longer spokes and a greater number of intermediate or supplemental spokes, while the general appearance of the wheel remains substantially the same for all sizes.

It will be understood that all nuts and threaded parts may be supplied with any suitable type of nut locks or may be arranged in any suitable way to prevent accidental loosening of the nuts or threaded parts.

What is claimed is:—

1. A vehicle wheel provided with hollow spokes each having tire holding members individual thereto and mounted in and slidable lengthwise thereof with elastic means within the respective spokes tending to maintain the tire supporting ends in the projected position, intermediate members of substantially the same diameter as the spokes and also provided with elastically mounted tire holding members like those of the spokes, and connecting means for the outer ends of the spokes and intermediate members locating said ends substantially equi-distantly from the axis of the wheel, the intermediate members having their inner ends extended to and lodged between the approaching sides of adjacent spokes closely adjacent to the hub ends of said spokes, and in direct side engagement with said spokes.

2. A wheel provided with radial tubular spokes and intermediate tubular members shorter than the spokes and having their inner ends cut away on opposite sides and lodged between and in direct contact with the spokes adjacent to the hub ends thereof, connecting and spacing means for the outer ends of the spokes and intermediate members, and elastically yieldable tire supporting means carried by and individual to each spoke and intermediate member.

3. A vehicle wheel provided with tubular spokes each having a segmental block secured thereto at the hub end in engagement with those of the next adjacent spokes, intermediate tubular members shorter than the spokes and each having a block secured thereto at the inner end and shaped for lodgment between and direct side engagement with adjacent spokes in close relation to the hub ends thereof and in partial embracing relation to the respective spokes where engaging them, means for uniting and spacing the outer ends of the spokes and intermediate members, and elastically yieldable tire supporting elements carried by and individual to each spoke and intermediate member.

4. A vehicle wheel provided with tubular spokes each having a segmental block secured thereto at the hub end, intermediate tubular members each having a block secured thereto at the inner end and shaped for lodgment between adjacent spokes in close relation to the hub ends thereof and in partial embracing relation to the respective spokes, means for uniting and spacing the outer ends of the spokes and intermediate members, and elastically yieldable tire supporting elements carried by each spoke and intermediate member, each spoke being provided at its outer end with an internally threaded sleeve receiving the spoke and embraced by the connecting means and each intermediate member having at its outer end an internally and externally threaded sleeve in which the intermediate member is secured and about which the connecting means extends, said sleeve having a nut applied to its externally threaded portion.

5. A wheel provided with tubular spokes in maximum number for the size of the wheel and intermediate tubular members of like diameter to and shorter than the spokes and having the outer ends coincident with the outer ends of the spokes and the inner ends tapered and lodged between the spokes adjacent to their hub ends and in direct engagement with and partial embracing relation to the spokes to thereby prevent lateral movement of the inner ends of the intermediate members, connecting means at the outer ends of the spokes and intermediate members, and elastically yieldable tire supporting elements carried by and individual to the spokes and intermediate members.

6. A wheel provided with tubular spokes in maximum number for the size of the wheel and intermediate tubular members having the outer ends coincident with the outer ends of the spokes and the inner ends tapered and lodged between the spokes adjacent to their hub ends, and in direct engagement with and partial embracing relation to the spokes to thereby prevent lateral movement of the said spokes and to the inner ends of the intermediate members, connecting means at the outer ends of the spokes and intermediate members, and elastically yieldable tire supporting elements carried by and individual to the spokes and intermediate members, the hub portion of the wheel being provided with opposite face plates of greater radial extent than the hub entering portions of the spokes and exterior to said hub entering portions in partial embracing relation to the said spokes and to the inner ends of the intermediate members where lodged between the spokes.

7. A wheel provided with tubular spokes in maximum number for the size of the wheel and intermediate tubular members shorter than the spokes and having the outer ends coincident with the outer ends of the spokes and the inner ends tapered and lodge between the spokes adjacent to their hub ends and in direct engagement with and partial embracing relation to the spokes to thereby prevent lateral movement of the inner ends of the intermediate members, connecting means at the outer ends of the spokes and intermediate members, and elastically yieldable tire supporting elements carried by and individual to the spokes and intermediate members, the hub portion of the wheel being provided with opposite face plates of greater radial extent than the hub entering portions of the spokes and in embracing relation to the inner ends of the intermediate members, said radially extended portions of the face plates being shaped for surface engagement with both the spokes and intermediate members where engaging the spokes adjacent to the hub ends thereof.

8. A vehicle wheel provided with tubular spokes in maximum number for the size of the wheel and having segmental blocks fast thereto at the hub ends, and intermediate tubular members corresponding in construction to the spokes with their inner ends each tapered and hollowed on opposite sides to lodge between and in direct engagement with and partial embracing relation to the spokes close to their hub ends, connecting and spacing means at the outer ends of the spokes and intermediate members, and yieldable tire supporting elements individual to respective spokes and intermediate members.

9. A vehicle wheel comprising spokes and intermediate members, the latter having the inner ends in direct engagement with and partial embracing relation to adjacent spokes adjacent to the hub ends of the spokes, connecting and spacing means at the outer ends of the spokes and intermediate members, and elastically yieldable tire supporting elements carried by the respective spokes and intermediate members, said intermediate members having means at their outer ends in coactive relation to the connecting and spacing means for the longitudinal adjustment of the intermediate members.

10. A vehicle wheel comprising a series of tubular spokes each having a segmental block secured thereto at the hub end, intermediate tubular members each with a block secured thereto at the inner end and lodged between adjacent spokes adjacent to the hub ends of the spokes, the inner ends of each intermediate member being shaped to partially embrace the spokes between which it is lodged, a sleeve on the outer end of each spoke and intermediate member, the sleeves of the intermediate members being externally threaded and provided with nuts for the longitudinal adjustment of the intermediate members, and tire supporting elements carried by and individual to the spokes and intermediate members.

11. A vehicle wheel provided with spokes, intermediate members having the inner ends lodged between and engaging the spokes adjacent to the hub ends of the latter, other intermediate members having the inner ends each lodged between a spoke and an intermediate member for engagement therewith, at a greater distance from the hub ends of the spokes than the first-named intermediate members, all the spokes and intermediate members having their outer ends at substantially the same distance from the axis of the wheel, connecting and spacing means for the outer ends of the spokes and intermediate members, and elastically yieldable tire supporting means individual to each spoke and intermediate member and projecting beyond the outer end thereof.

In testimony, that I claim the foregoing as my own, I have hereto affixed my signature in the presence of two witnesses.

JOHN J. FAHRNEY.

Witnesses:
B. W. HITE,
E. M. HOOVER.

Copies of this patent may be obtained for five cents each, by addressing the "Commissioner of Patents, Washington, D. C."